March 18, 1930.  V. A. KINCANNON  1,751,241
ELECTRIC STOVE AND ATTACHMENT
Filed June 2, 1926  3 Sheets-Sheet 1
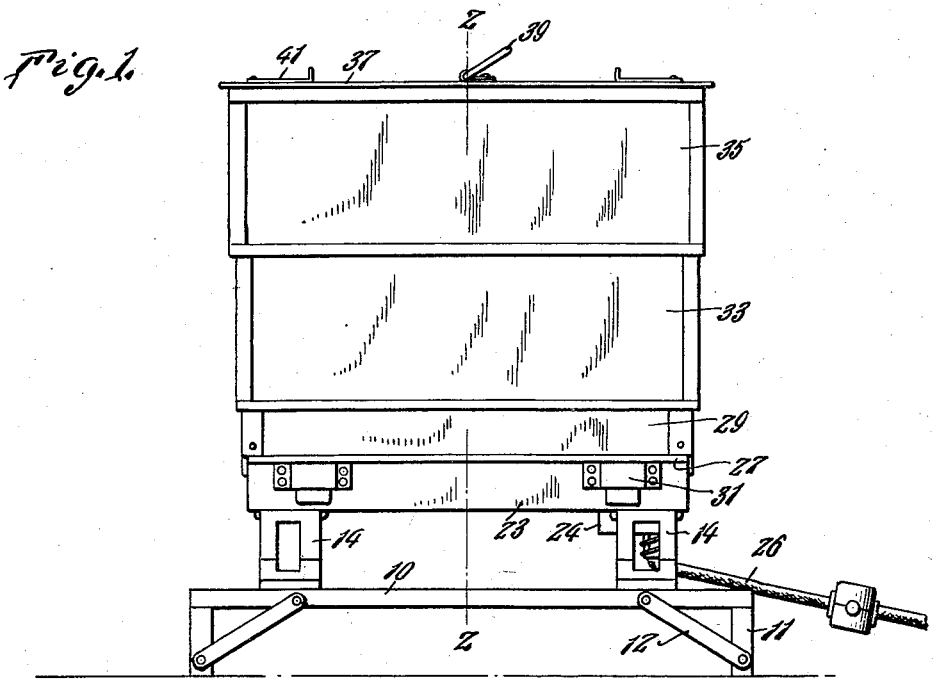
Fig. 1.
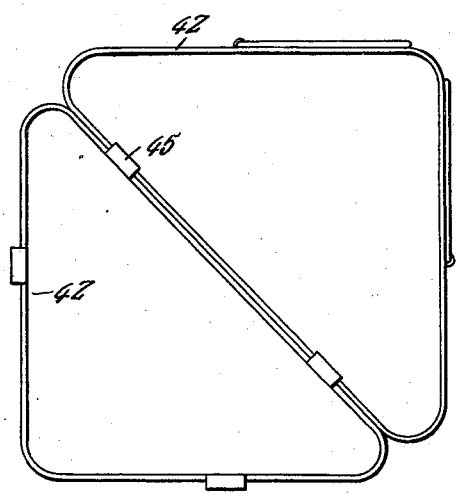
Fig. 8.
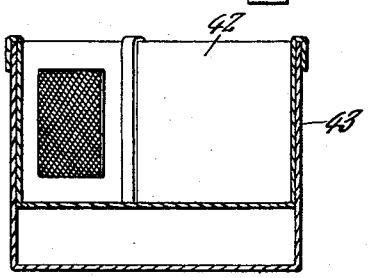
Fig. 9.
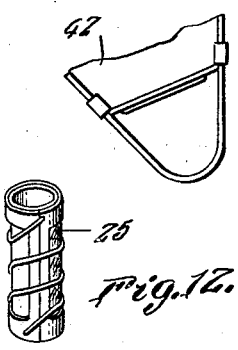
Fig. 10.
Fig. 12.
V. A. Kincannon
INVENTOR
BY Victor J. Evans
ATTORNEY

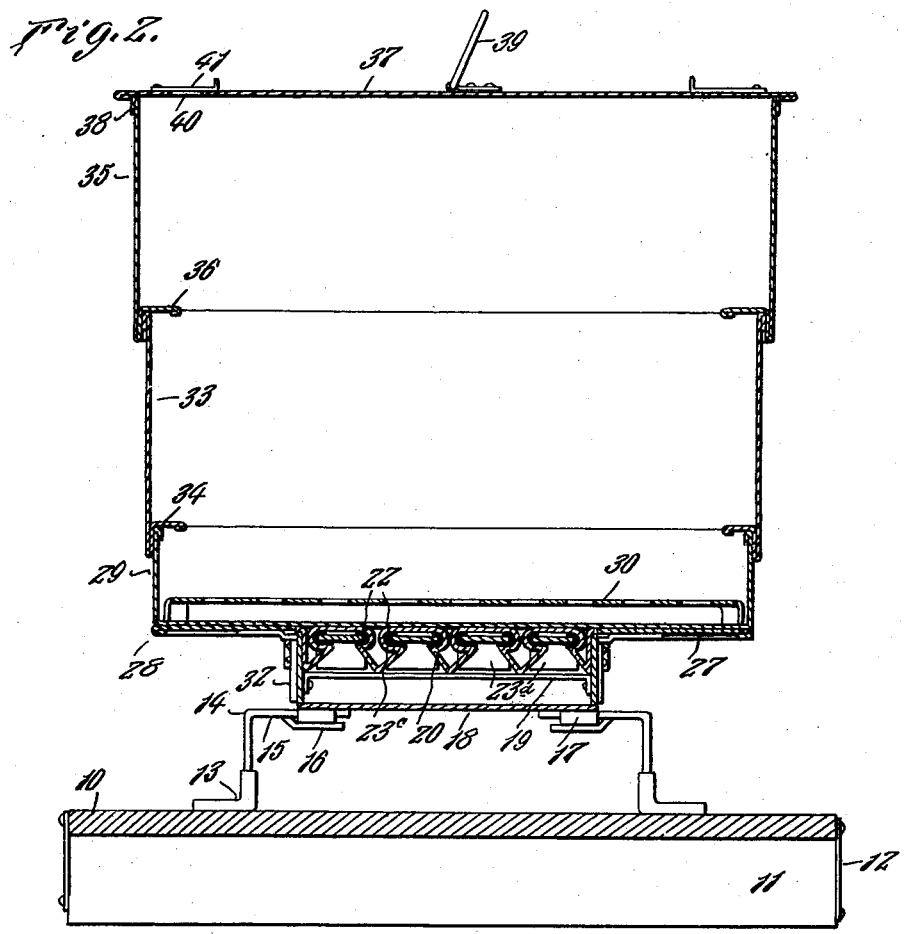

March 18, 1930.  V. A. KINCANNON  1,751,241
ELECTRIC STOVE AND ATTACHMENT
Filed June 2, 1926   3 Sheets-Sheet 3
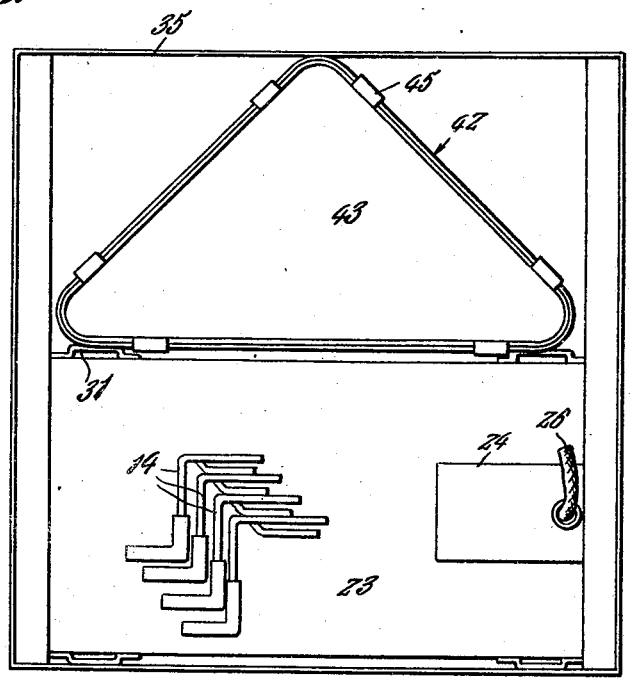
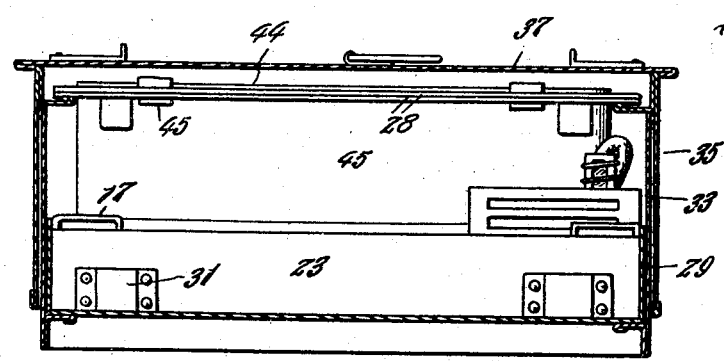
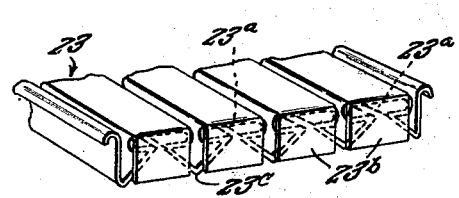
V. A. Kincannon
INVENTOR
BY Victor J. Evans
ATTORNEY Patented Mar. 18, 1930

1,751,241

UNITED STATES PATENT OFFICE

VICTORIA A. KINCANNON, OF NEW YORK, N. Y.

ELECTRIC STOVE AND ATTACHMENT

Application filed June 2, 1926. Serial No. 113,224.

This invention relates to electric heating devices, particularly to stoves intended for cooking purposes, and has for its object the provision of a novel electric stove embodying various attachments adapted to be connected therewith for carrying out roasting, toasting, broiling and other cooking operations in an expeditious and economical manner.

An important object of the invention is to provide an electric stove embodying a novel heating element including metallic elements insulated by mica or the like and supplied with current through a conducting cord passing through an effective insulating means located within an air space having air vents so as to positively prevent overheating and scorching of the cord with resultant deterioration or destruction of the covering thereof.

Another important object is to provide an electric stove embodying a peculiarly constructed and novel heating unit, the parts of which are fully protected against damage in case liquid is spilled on the stove, or for instance when a pot or kettle boils over.

Another object of the invention is to provide a stove of this character provided with a removable or detachable base and embodying a plurality of elements which are normally arranged in telescoped relation so as to define various cooking compartments within the individual or selected ones of which the various toasting, roasting, baking and other cooking operations may be carried out without any one interfering with the other.

Still another object is to provide a stove of this character in which the parts are so constructed that when disconnected they may be nested so as to occupy the minimum space in transportation or storage.

A further object of the invention is to provide a stove of this character having a base structure which embodies the heating element and which is provided with means for the detachable mounting thereon of the stove or cooking element or casing elements as they may well be called.

An additional object is to provide a device or structure of this character which will be comparatively simple and inexpensive in manufacture, easy to set up and use, positive in action, efficient and durable in service, and a general improvement in the art.

With the above and other objects and advantages in view, the invention consists in the details of construction and the arrangement and combination of parts to be hereinafter more fully described and claimed, and illustrated in the accompanying drawings, in which:—

Figure 1 is a side elevation of the complete device in setup condition.

Figure 2 is a vertical section therethrough taken on the line 2—2 of Figure 1.

Figure 3 is a plan view of one section.

Figure 4 is a cross sectional view showing certain of the parts nested with the double boiler structure arranged therein with the elements thereof in side by side position.

Figure 5 is a detail view of one of the metallic elements of the heating unit.

Figure 6 is a vertical section through the heating unit illustrating the vent means or ventilating chamber for the current conducting cord.

Figure 7 is a fragmentary detail view of one of the supporting legs and socket therefor.

Figure 8 is a detail view of the double boiler structure.

Figure 9 is a detail view of a coffee pot or tea steeping structure, and

Figure 10 is a fragmentary detail view of the triangular shaped member.

Figure 11 is a fragmentary perspective view of the heating unit, and

Figure 12 is a perspective view of the cord protecting device.

Referring more particularly to the drawings, the numeral 10 designates a base which may be in actual practice constructed of a wooden board or the like and provided at its ends with cleats 11 held in place by diagonal brace members 12 secured thereto and to the board or base. Mounted upon the top of this base member are L-shaped sockets 13 arranged preferably in a manner disclosed and adapted to receive or carry L-shaped leg members 14 which have horizontal portions 15 and tongues 16 adapted, respectively, to engage within and beneath socket members or guides 17 on the bottom of a pan-like member or casting 18 which is preferably of rectangular formation and which embodies a transverse supporting element 19 above which is mounted the heating unit indicated generally by the numeral 20.

In the present instance, the heating unit is shown as comprising resistance elements preferably constructed of a sheet 21 of suitable metal, cut out into serpentine form as indicated in Figure 5, any desired number of these elements being used, of course all being separated by sheets 22 of mica or other suitable insulating material. The resistance elements and the insulators are enclosed within pockets 23ª in a protective shell 23, depending tongues 23ᵇ being provided to cover the ends of the pockets. Between the pockets are V-shaped portions 23ᶜ having openings 23ᵈ therein to permit the escape of any spilled liquid accumulating therein.

Beneath the heating elements, the casing 18 is provided with a chamber 24 having air vents 24ª formed as slots, this chamber containing a sleeve 25, preferably of insulating material, such as mica through which extends the conducting cord 26 which is connected with the resistance elements for the purpose of supplying current thereto, this sleeve acting to prevent burning of the cord.

Mounted at the opposite sides of the casing 18 are detachable shelf members 27 held in place by any desired means and provided for the purpose of widening the heating surface.

Mounted upon, or if preferred, secured to this casing 18 is a shelf structure 28 upon which is arranged an open topped pan member 29 within which is preferably disposed a grille or grid 30 upon which may be laid articles to be broiled or roasted. It is conceivable that bread slices may be placed upon this grille or grid and that they will be effectually browned or toasted in a well known and obvious manner owing to the influence of the heat. In the present instance, the casing member 18 is shown as provided at its sides with socket elements 31 within which are detachably engaged depending leg elements 32 carried by the member 27, this providing a very effective detachable connection.

Detachably engaged upon the member 29 is an open topped oven member 33 provided at its lower ends with a flange structure 34 spaced inwardly from the end and engageable over the top of the casing member 29 for the purpose of holding the two casings or shells in the proper relation. In Figure 2 I have also shown an additional casing member 35 detachably telescoped upon the section or member 33 and provided at its lower end portion with an inwardly directed ledge or flange 36 spaced from the lower edge and resting upon the top of the shell or casing member 33. I have also disclosed, in Figure 2, a lid or cover for the entire structure, this lid or cover being designated by the numeral 37 and having a depending flange 38 telescopically engaged upon the shell section or casing section 35, the cover 37 having a ring-like or other handle 39 and being provided near its ends with vents 40 covered by hingedly mounted door members 41 whereby the proper degree of ventilation may be obtained.

Clearly, the various shell members may be arranged in the inverted relation to what is shown in Figure 2, as indicated in Figure 4 and when this is done, it is clear that I may provide in the space within the telescoped or collapsed shell a double boiler structure indicated generally by the numeral 42, this double boiler structure including a triangular shaped member 43 provided with a removable cover 44 telescopically engaged thereon, the telescopic engagement being effected by means of coacting guide members or lugs 45. Obviously, when any food to be cooked is placed within the member 43 and the cover 44 applied thereto and the member 43 located within the collapsed oven structure, the same effect is produced as if there were a water bath or double boiler construction.

In the use of the device, it will be readily apparent that when it is intended to provide an oven structure, the shell members 35 and 33 and the lid 37 are arranged as indicated in Figure 2, and when this is done it is clear that bread may be toasted or meat or the like may be broiled or roasted, as is true of potatoes and vegetables, without any further adjustment of the parts. By collapsing the casing or shell into the position shown in Figure 4, it is apparent that the same result may be obtained with a more compact structure and in this latter mentioned instance, the double boiler structure may be utilized for the purpose of cooking certain food products. It is really believed that the construction, operation and advantages will be readily apparent to one skilled in the art without further explanation.

While I have shown and described the preferred embodiment of the invention, it should be understood that I reserve the right to make such changes in the form, construction and arrangement of parts as will not depart from the spirit of the invention or the scope of the subjoined claim.

Having thus described the invention, I claim:—

In an electric stove, a supporting stand, a relatively small pan spaced above the stand, socket members on the bottom of said pan, substantially inverted L-shaped legs rising from the stand and having their corresponding horizontal branches received by said sockets to support the pan, a heating unit reposing upon said pan, socket members arranged on the sides of said pan, a shell structure arranged above the pan, depending legs carried by the shell and received by the last mentioned sockets, a relatively large pan member supported on said shell, an oven member formed with an inwardly directed flange adjacent the lower edge thereof, and engaging the upper edge of the second mentioned pan to support the oven member thereon, a casing like member arranged above the oven like member and including inwardly directed flanges reposing upon the upper edge of said oven like member, said members being of different sizes whereby they are capable of adjustment in telescoped relation, and a removable cover for the uppermost casing like member.

In testimony whereof I affix my signature.

VICTORIA A. KINCANNON.